March 4, 1969 J. S. PALMER 3,430,992

WEDGE WHEEL SECURING ASSEMBLY

Filed April 20, 1967 Sheet 1 of 4

Inventor:
John S. Palmer
By Walter F. Murray
Atty.

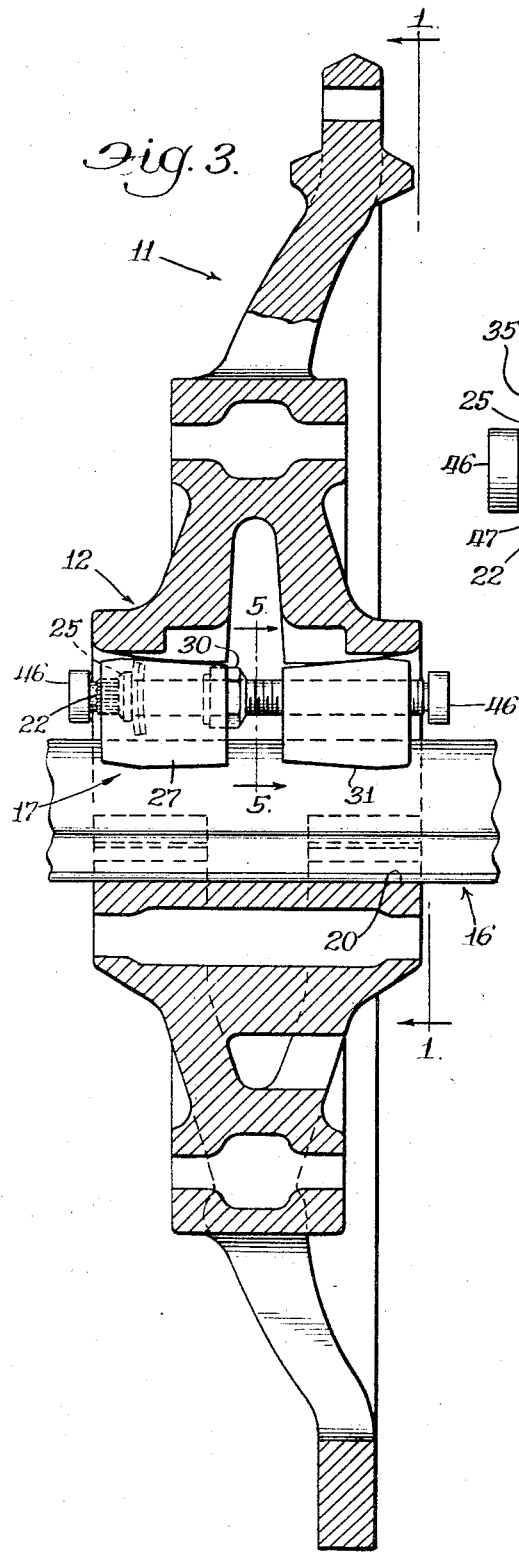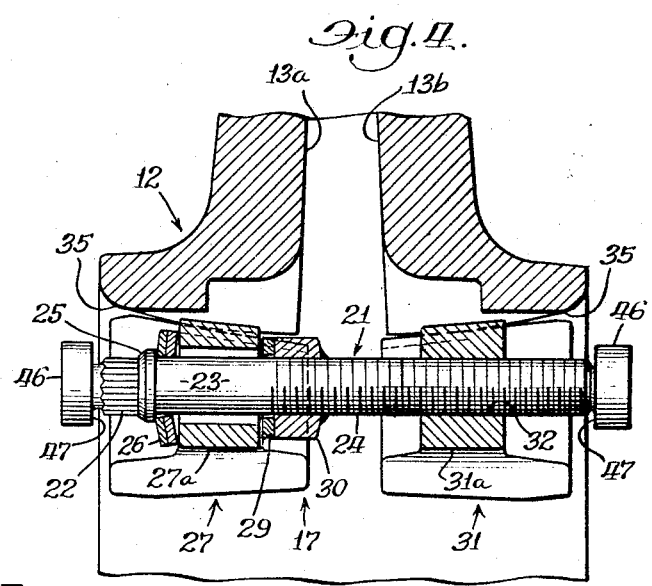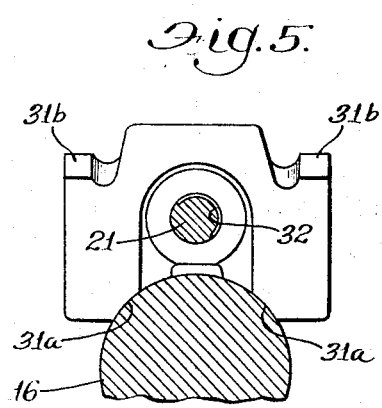

Inventor:
John S. Palmer
By: [signature]
Atty.

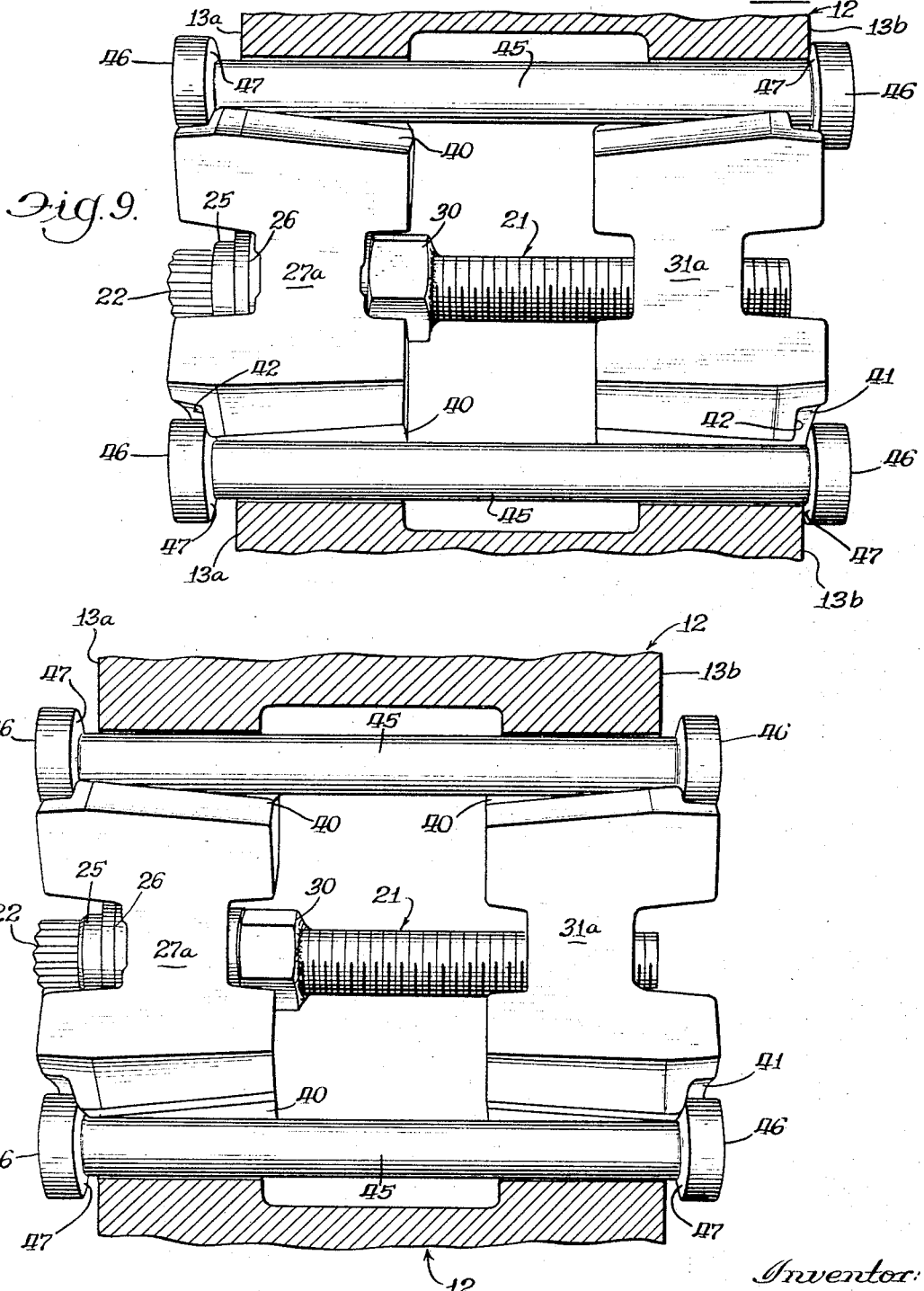

United States Patent Office 3,430,992
Patented Mar. 4, 1969

3,430,992
WEDGE WHEEL SECURING ASSEMBLY
John S. Palmer, Clarendon Hills, Ill., assignor to International Harvester Company, Chicago, Ill., a corporation of Delaware
Filed Apr. 20, 1967, Ser. No. 632,351
U.S. Cl. 287—52.06                 8 Claims
Int. Cl. F16b 3/06

ABSTRACT OF THE DISCLOSURE

An assembly for releasably securing a tractor wheel in variable driving relation with an axle. A generally central opening in an enlarged hub-like portion of the wheel forms a housing for receiving (a) the axle in splined relation and (b) a sub-assembly of two oppositely tapered members mounted on a rotatable shaft and slidably arranged in variable spaced relation on the axle for movement, upon rotation of the shaft, of wedges embodied therein into and out of wedging engagement with opposing generally parallel longitudinally convex ramps of the housing. One member, in freely rotatable relation on the shaft, is held against movement longitudinally thereof: the other is threaded on the shaft, which, when the sub-assembly is in operative position and the members held against rotation, functions as a screw and causes said other to move longitudinally of the shaft as the latter is rotated. To facilitate release of the wheel, in the event that one of the members should fail to loosen upon approriate rotation of the shaft, supports in the form of cradles extending longitudinally of the members on opposite sides thereof in axially parallel relation with the shaft are provided to seat removable implements in the form generally of dumb-bells. The latter have radially extending terminal flanges engageable with complementary flanges of the housing and the members to limit movement of the other member relative to the axle. A dual arrangement of dumb-bells and associated parts, upon continued appropriate rotation of the shaft enables the distribution of retractive force alike to the opposing wedges of each member, consequent breaking of the wedging bond, and release of the members and wheel, while averting bending of the shaft.

References

This assembly is an improvement of that described and claimed in my copending application Ser. No. 587,778, filed Oct. 19, 1966, wherein the background of invention, the state of the prior art, difficulties encountered, and ends sought to be attained, generally are stated, with particular reference to Smelcer et al., U.S. Patent No. 3,279,831 of Oct. 18, 1966.

The stated arrangement of cradles, dumb-bells and flanges is provided in lieu of the complementary interengageable restrictive means of the cited application to equalize the distribution of retractive force to the bonded wedges, thereby averting distortion of the sub-assembly and enable the overcoming of the wedging bond and release of the wheel from the axle more efficaciously. The differences of structure are apparent upon comparison of the drawings.

Summary

The sub-assembly having been operated to cause interengagement of the wedge and ramp surfaces securing the wheel on the axle, rotation of the shaft, i.e., turning the screw, in wedge-releasing direction having freed one of the members but not the other the dumb-bells are seated in their respective cradles with their radially extending terminal flanges in predetermined spaced relation with complementary flanges of the housing and the wedges. Such rotation being continued causes corresponding movement of the dumb-bells carried by the freed member to a point of engagement of one flange thereof with an opposing flange of the housing thereby braking movement of that wedge in relation to the axle and with continued turning of the screw building up pressure on the other wedge ultimately freeing it and enabling removal of the wheel. The dual arrangement of dumb-bells and supporting cradles in relation to opposing walls of the wheel hub serves to equalize the application of retractive force to the bonded wedges and to avert bending of the shaft.

Figure 1:
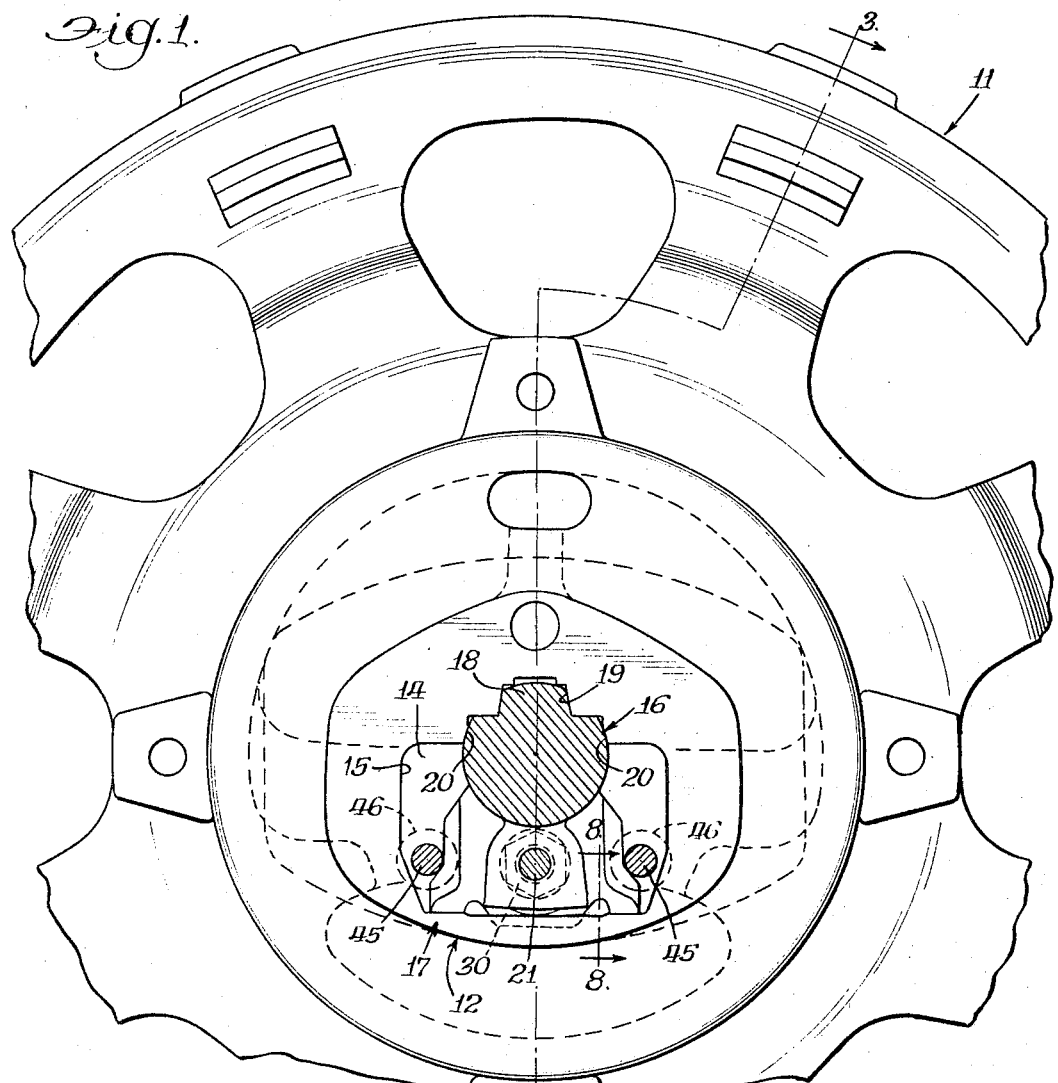
Figure 2:
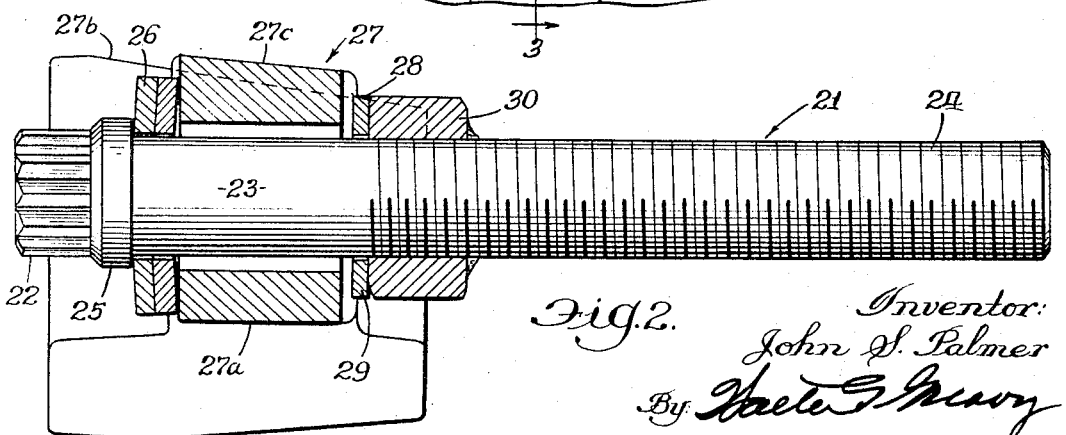
Figure 6:
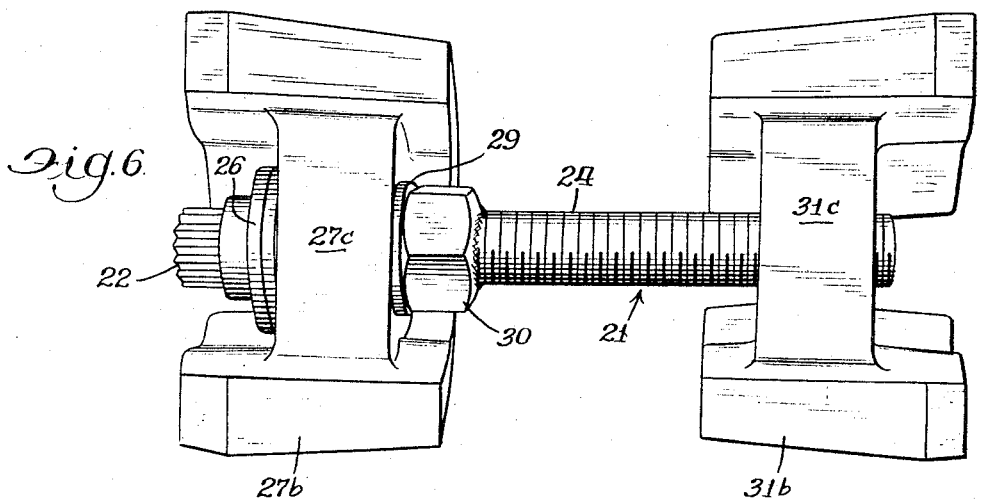
Figure 7:
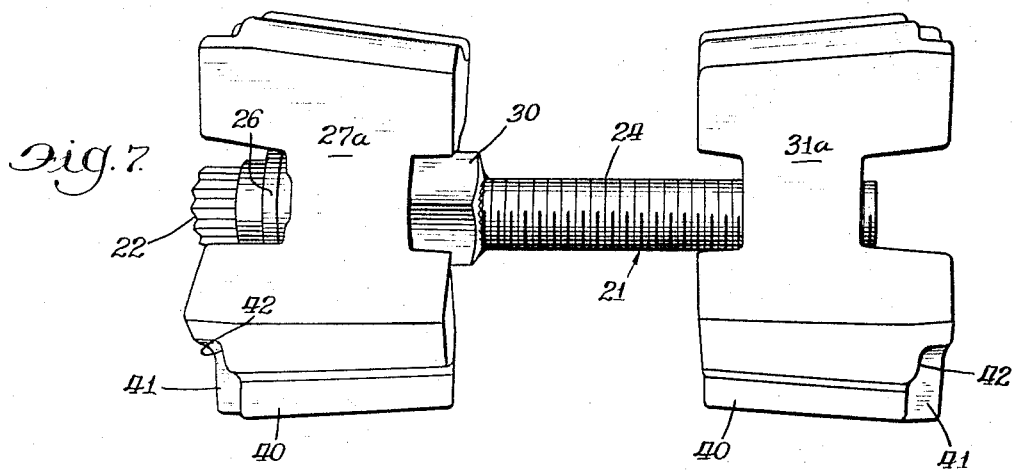
Figure 8:
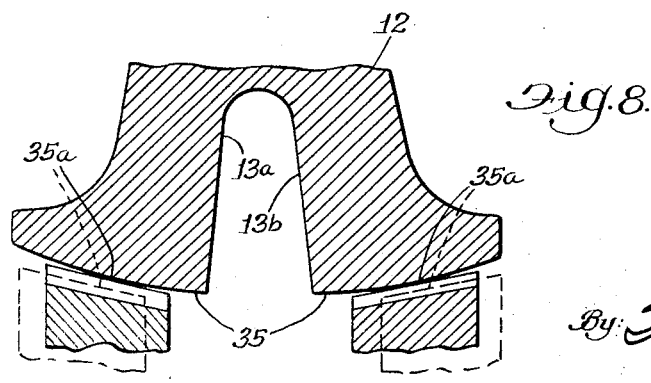

In the drawings:
FIG. 1 is a side elevation of a portion of a wheel and axle assembly embodying the invention, as indicated in FIG. 3, partially in section.
FIG. 2 shows a detail vertical section of a portion of a sub-assembly forming a part of the invention.
FIG. 3 shows a partial section along the line 3—3, of FIG. 1 rotated 180° showing the sub-assembly in preferred position of operation securing the wheel on the axle.
FIG. 4 is an enlarged detail in vertical section of a portion of the invention shown in FIG . 3.
FIG. 5 is a section at 5—5 of FIG. 3.
FIG. 6 is a plan view of one side of the sub-assembly showing the parts thereof in preliminary position of assembly.
FIG. 7 is corresponding view of another side of the sub-assembly.
FIG. 8 is a detail section along the line 8—8 of FIG. 1 rotated 180° with dotted lines indicating a preliminary position of the sub-assembly.
FIG. 9 is a view of the sub-assembly with supplemental parts, in one position of adjustment.
FIG. 10 is a view of the sub-assembly with supplemental parts, in another position of adjustment.

Description

Referring to the drawings, web-type cast iron drive wheel 11 of a heavy-duty type of agricultural tractor (not shown) has an enlarged central hub portion 12 with spaced walls 13a, 13b and a generally central opening 14 extending therethrough. This opening generally defines a housing 15 arranged to receive in complementary operative relation a generally cylindrical axle 16 of the tractor and a generally wedge-type mechanism comprising a sub-assembly 17 cooperative with the axle and the wheel for releasably securing the wheel in driving relation upon the axle.

Axle 16, in the preferred form of my invention, has cutaway portions defining a longitudinally extending key 18 receivable in splining relation in key way 19 arranged in opening 14 in spaced relation with the axis of the wheel and extending therethrough.

Arcuate surfaces 20, 20 of housing 15 interiorly of hub 12 are arranged in suitable relation with key way 19 to receive axle 16 in releasable, non-rotatable coaxial relation with the wheel, and secured upon operation of sub-assembly 17.

Sub-assembly 17 comprises a bolt-like drive shaft 21 having a head 22 for turning it, an unthreaded portion 23 and a threaded portion 24. A shoulder 25 extends circumferentially of the shaft adjacent the head to provide a support for a Belleville spring type washer 26 disposed intermediately of the shoulder and a first wedge-type member 27 journalled on unthreaded portion 23 and having a forward recess 28 for receiving in rotative relative a thrust washer 29 and a stop collar 30, which is welded to shaft 21. The stated parts generally are arranged to enable relative rotation between the shaft and member 27 while permitting only slight movement of the latter longitudinally of the shaft.

Sub-assembly 17 comprises in addition to member 27 a second wedge-type member 31 generally similar to member 27 but having a generally central threaded bore 32 for receiving threaded portion 24 of shaft 21 in operative threaded relation, and in generally opposed variable spaced relation with member 27.

Members 27 and 31, as shown in FIGS. 4, 5 and 7, have a curved surface 27a, 31a, respectively, co-axial with an abutting surface of axle 16, for receiving the latter in slidable bearing relation longitudinally of the axle. Other surfaces of these members (FIGS. 4, 6) comprise generally parallel uniplanar cam portions or wedges, 27b, 31b of like dimension, configuration and arrangement, flanking a generally flat central or web portion 27c, 31c. The wedges of one member taper correspondingly with those of the other but in opposite direction (left versus right, FIG. 4) when the members are arranged on shaft 21 as previously indicated.

The stated parts of sub-assembly 17 are so arranged and disposed in relation to one another that when members 27, 31 are held against rotation relative to one another, as they are when the sub-assembly is in operative position in the housing, the wedges then being in position for movement into wedging engagement with ramps of the housing, and shaft 21 is rotated by turning head 22 in one direction (clockwise as shown, looking to the right in FIG. 4), member 31 will move along the threaded portion of the shaft toward member 27; and when head 22 is turned in the reverse direction (counter-clockwise), member 31 will move in the opposite direction. Thus as head 22 and shaft 21 are rotated under such conditions of operation, so members 27, 31 and their respective wedges are brought together or farther removed from one another, and wedging operation thereof enhanced or diminished.

Within housing 15 generally arcuate ramps 35, 35 of like dimensions and form, are arranged in predetermined spaced relation on walls 13a, 13b (FIGS. 3, 4, 8) correspondingly for tangential wedging engagement with wedges 27b, 31b, respectively, in certain conditions of operation of sub-assembly 17. Ramps 35 preferably are convex longitudinally and formed and arranged for effective wedging engagement with opposing wedges 27b, 31b at a target point 35a approximately midway lengthwise of the ramps; i.e., the center of the pad of the wheel.

In preferred practice of the invention, the wheel is first positioned on the axle 16 by sliding with key 18 in key way 19, adjacent curved surfaces of the wheel sliding along the adjacent surfaces of the axle, to the desired position of adjustment of the wheel on the axle. Sub-assembly 17, with the parts generally in the position of FIGS. 6, 7, is then manually positioned within housing 15 with the wheel in the position of FIG. 1. At that point shaft 21 is rotated by turning head 22 in that direction which will cause member 31 to move toward member 27 and bring wedges 27b, 31b, respectively, into tight wedging engagement with ramps 35, 35, which should reach the desired magnitude for securing the wheel in operative relation on the axle at the target point 35a. When that is achieved the wedges 27b, 31b of members 27, 31 will be firmly clamped against abutting surface of axle 12 thereby securing the wheel in desired position of adjustment on the axle.

Alternatively, the sub-assembly with the parts in the position illustrated in FIG. 10 may be positioned in housing 15 prior to placing the wheel on the axle.

Release of the wheel from the axle is accomplished by reverse rotation of shaft 21, which functions as a screw setting up a retractive force urging wedging member 31 longitudinally of the shaft away from member 27, and correspondingly removing wedges 27b, 31b from wedging engagement with ramps 35, 35; that force increasing with continued reverse rotation of the shaft until the wedging engagement of one or the other of the wedges is broken.

As the heavy duty demands upon the tractor require that the wheel be secured upon the axle with corresponding firmness, which entails the establishment of a strong bond and very tight engagement of the wedges and ramps, there is a tendency of the wedges of one or the other of the members to stick to the associated ramps necessitating the application of considerable pressure to disengage them. To overcome the sticking or wedging bond, which is often disparate and unpredictable, and facilitate the freeing of the wedges, without subjecting the parts of the mechanism and particularly shaft 21 to undue twisting or bending forces, a dual arrangement of means is provided for distributing the retractive force alike to the opposing wedges of the stuck member. Accordingly cradles 40 are arranged laterally of members 27, 31 and of wedges 27b, 31b for receiving dumb-bells 45 in operative position to limit movement of the freed wedges relative to the axle and so effectuate the retractive force longitudinally of the shaft and equalize the application thereof to the bonded wedges.

Cradles 40, 40 (FIGS. 1, 7, 9, 10) are generally trough-like in form and arranged to receive the dumb-bells in generally parallel relation axially with one another and with shaft 21, having depressed end portions 41 for receiving enlarged portions of the dumb-bells and providing flanges 42 limiting movement of the dumb-bells longitudinally.

Dumb-bells 45, 45 are generally rod-like implements long enough to span members 27, 31 and walls 13a, 13b, which serve as flanges limiting longitudinal movement of the dumb-bells (as illustrated in FIGS. 9, 10), which have end portions 46 of enlarged diameter and providing flanges 47, co-operative with walls 13a, 13b and flanges 42 of members 27, 31. The end portions 46, while shown round may be of other suitable configuration; e.g., hexagonal.

Upon turning of the shaft 21 in the appropriate direction, at least one of the members will be freed. Dumb-bells 45 are then placed in operative position on cradles 40, as illustrated in FIGS. 1, 9, 10. The dumb-bells and sub-assembly 17 then assume the position illustrated in FIG. 9 in which member 27 has become loose. Member 31 being still stuck, flanges 47 at one end of the dumb-bells (right) abut the inner wall 13b of wheel 11 and those at the other end (left) abut flanges 42 of member 27 and are relatively removed from the outer wall 13a of the wheel and from flanges 42 of member 31.

The leverage afforded by the dumb-bells in this position, member 27 being held against movement longitudinally of the axle, serves to effectuate the rotative screw pressure, the dual distributing this leverage or retractive force alike to the bonded wedges; in the present example wedges 27b, 27b; so that upon further rotation of shaft 21 member 31 is forced to the right, ultimately breaking the wedging bond and freeing this member, without bending of shaft 21, or distortion of the sub-assembly.

When the position shown in FIG. 10 is reached flanges 47 are relatively displaced from both walls 13a, 13b. The dumb-bells can then be removed and kept in the tractor tool box.

It will be understood that changes of form and structure including reversal of parts, substitution of equivalents, and other modifications, may be made without departing from the spirit, substance and scope of the invention.

I claim:

1. A wedge wheel securing assembly comprising a wheel, an axle and a sub-assembly for releasably securing the wheel in variable driving relation on the axle, said wheel including a generally central portion comprising spaced walls forming a housing and an opening therethrough for receiving said axle in co-axial driving relation, and generally parallel ramps on said walls interiorly of said housing in predetermined spaced relation with one another and with the axis of the wheel, said ramps being convex longitudinally thereof and respectively formed and positioned for tangential wedging engagement with corresponding wedges of said sub-assembly, said sub-assembly being receivable in said housing in cooperative relation with said housing and said axle, and comprising
   (1) a rotatable drive shaft,
   (2) a first member mounted on said shaft adjacent one end thereof co-axially and in rotative relation therewith,
   (3) means on said shaft restricting movement of said first member longitudinally of said shaft,
   (4) a second member removably threaded on said shaft in variable, opposed spaced relation and coaxially with said first member,
   (5) said members being generally similar in conformation and having on one side thereof a bearing surface for receiving a corresponding surface of said axle in co-axial sliding relation, and on the opposite side thereof in predetermined spaced relation with one another and with the axis of said shaft a plurality of generally parallel wedges,
   (6) said wedges being arranged for releasable wedging engagement with corresponding ramps in certain conditions of operation of said sub-assembly,
   (7) said first and second members and the parts of said sub-assembly associated therewith being so conformed and arranged for operation in relation to one another and to said shaft that, upon said sub-assembly being positioned for operation within said housing, with said wedges respectively in juxtaposition with corresponding ramps, the axle being disposed in driving relation with the wheel, rotation of said shaft in one direction will cause relative movement of the members toward one another and bring the respective wedges into tangential wedging engagement with corresponding ramps thereby clamping the wheel upon the axle, and subsequent predetermined reverse rotation of the shaft, will cause reverse movement of the members enabling release of the wheel, said sub-assembly including additionally means carried by said members and operative, in the event of failure of one the members to respond to such reverse rotation, to limit relative movement of the other of said members longitudinally of said axle and enable the freeing of said one member, said means comprising,
   (a) dumb-bells supportable on said members along opposite sides thereof in position spanning said members and overlapping the walls of the housing, and for relative movement longitudinally and in axially parallel spaced relation with one another and with said axle and shaft,
   (b) said dumb-bells being generally similar and and having end portions of enlarged diameter and providing radial flanges axially inward thereof and in predetermined spaced relation with one another,
   (c) said members having indented end portions for receiving the enlarged portions of said dumb-bells for limited relative movement longitudinally,
   (d) said members, said dumb-bells and the walls of said housing being conformed and arranged so to operate that when upon stated rotation of the shaft for releasing the wheel from the axle, the wedges of one member and corresponding ramps are bonded together, the other member being free, upon such rotation of the shaft being continued certain flanges of the dumb-bells will engage a proximate wall of the housing thereby limiting relative movement of said free member longitudinally of the axle and enable the breaking of the bond.

2. A wheel securing assembly as defined in claim 1 in which said first and second members have generally trough-like cradles extending longitudinally thereof along opposing sides for supporting the dumb-bells respectively in axially parallel spaced relation with one another and with the axle and the shaft, said cradles having depresed portions for receiving the enlarged portions of said dumb-bells and providing flanges engageable with corresponding flanges of said dumb-bells for limiting relative longitudinal movement therebetween.

3. A wheel securing assembly as defined in claim 1 including a dual arrangement of dumb-bells and associated parts in co-operative relation with the members and the walls of the housing to enable distribution of retractive force alike to the bonded wedges.

4. In a wedge wheel securing assembly comprising
   (a) a generally cylindrical axle for mounting a wheel in variable driving relation,
   (b) a wheel having an enlarged hub-like central portion with spaced walls forming a housing and an opening therethrough for receiving the axle in positions of adjustment,
   (c) complementary means on said axle and wheel for preventing relative rotation therebetween,
   (d) a plurality of generally parallel longitudinally convex ramps on said wheel interiorly of said housing in selected spaced relation with one another and with the axis of the wheel,
   (e) a wedge-type sub-assembly receivable in said housing and including first and second tapered members in operative arrangement with one another and with said housing and said axle for releasably securing said wheel in variable driving relation on said axle, said members being generally similar and having on one side thereof a bearing surface in co-axial sliding relation with a corresponding surface of said axle, and on the opposite side thereof in predetermined spaced relation with one another and with said bearing surface a plurality of generally parallel wedges respectively arranged correspondingly for releasable wedging engagement with said ramps in certain conditions of operation of said sub-assembly, said sub-assembly including a drive shaft rotatable about an axis in parallel spaced relation with the axis of said axle and operative to move said wedges into and out of said wedging engagement, said first member being journalled coaxially on said shaft adjacent one end thereof, and held against movement longitudinally, said second member being threaded on said shaft in variable, opposed spaced relation and coaxially with said first member, said first and second members and the parts of said sub-assembly associated therewith being so conformed and arranged for operation in relation to one another and to said shaft that, upon said sub-assembly being positioned for operation within said housing, with said wedges respectively in juxtaposition with corresponding ramps, the axle being disposed in driving relation with the wheel, rotation of said shaft in one direction will cause said members to move toward one another thereby bringing the respective wedges into tangential wedging engagement with said corresponding ramps and clamping the wheel upon the axle, and subsequent predetermined reverse rotation of the shaft, will cause reverse movement of the members enabling release of the wheel, apparatus selectively co-operative with said parts of said assembly to enable release of the wheel from the axle, and comprising
  (1) cradles carried by said members along opposite sides thereof,
  (2) dumb-bells supportable on said cradles for movement longitudinally of said members,
  (3) said dumb-bells having end portions of enlarged diameter and providing flanges axially inward thereof in predetermined spaced relation with one another,
  (4) said cradles having depressed portions for receiving the enlarged portions of said dumb-bells and providing flanges engageable with corresponding flanges of said dumb-bells for limiting relative longitudinal movement therebetween,
  (5) said members, said dumb-bells, said housing, and the respective flanges thereof being conformed and arranged in relation to one another so that in certain operative positions of said members in which the wedges of one of said members and the corresponding ramps are bonded together, the other of said members being free, upon further appropriate rotation of said shaft, certain flanges of said dumb-bells co-operate with proximate flanges of said members and other flanges of said dumb-bells cooperate with proximate flanges of said housing, to limit relative movement of said one of said members longitudinally of said axle and enable the breaking of the bond.

5. The apparatus of claim 4 in which the cradles are generally trough-like and disposed in cooperative spaced relation with the axis of the shaft and with the walls of the housing to support the dumb-bells in operative position in relation to the members and said housing.

6. The apparatus of claim 5 including a dual arrangement of dumb-bells with opposed flanges cooperative with corresponding flanges of the members and of the housing to enable distribution of retractive force alike to the bonded wedges.

7. The apparatus of claim 4 in which the dumb-bells are generally similar, and supported in axially parallel spaced relation with the shaft.

8. The apparatus of claim 7 in which the dumb-bells span the opposed members laterally thereof and in certain conditions of operation of the members, certain of the flanges of the dumb-bells are cooperative with proximate flanges of the housing and non-cooperative with proximate flanges of one member, certain other flanges of the dumb-bells being then cooperative with proximate flanges of said one member and non-cooperative with proximate flanges of the housing, said two groups of flanges of the dumb-bells being disposed in opposed spaced relation with one another.

References Cited

UNITED STATES PATENTS 3,279,831 10/1966 Smelcer et al. _____ 287—52.05
3,302,959 2/1967 Smelcer _____ 287—52.06

CARL W. TOMLIN, *Primary Examiner.*

A. KUNDRAT, *Assistant Examiner.*

U.S. Cl. X.R.

287—52.09